(12) United States Patent
Lawless et al.

(10) Patent No.: US 12,371,135 B2
(45) Date of Patent: Jul. 29, 2025

(54) CASSETTE ASSEMBLY, WATERBORNE VESSEL AND METHOD OF SERVICING A WATER-ACCESSIBLE STRUCTURE

(71) Applicant: BMT LIMITED, London (GB)

(72) Inventors: Jago William Lawless, London (GB); Samuel George Alan Stevens, London (GB); Christopher John Witty, London (GB)

(73) Assignee: BMT LIMITED, London (GB)

( * ) Notice: Subject to any disclaimer, the term of this patent is extended or adjusted under 35 U.S.C. 154(b) by 377 days.

(21) Appl. No.: 17/799,208

(22) PCT Filed: Feb. 3, 2021

(86) PCT No.: PCT/GB2021/050230
§ 371 (c)(1),
(2) Date: Aug. 11, 2022

(87) PCT Pub. No.: WO2021/160990
PCT Pub. Date: Aug. 19, 2021

(65) Prior Publication Data
US 2023/0074132 A1    Mar. 9, 2023

(30) Foreign Application Priority Data
Feb. 12, 2020   (GB) ...................................... 2001920

(51) Int. Cl.
*B63B 59/02*        (2006.01)
(52) U.S. Cl.
CPC .................................... *B63B 59/02* (2013.01)

(58) Field of Classification Search
CPC . B63B 59/00; B63B 59/02; E02B 3/00; E02B 3/26; E02B 17/00
USPC ........................................................ 114/219
See application file for complete search history.

(56) References Cited

FOREIGN PATENT DOCUMENTS

| EP | 2520485 A1 * | 11/2012 | ............. B63B 21/00 |
| EP | 2 923 941 | 9/2015 | |
| EP | 3 323 708 | 5/2018 | |
| GB | 2476858 | 7/2011 | |
| GB | 2490252 | 10/2012 | |

OTHER PUBLICATIONS

Search Report for GB Application No. 2001920.4 dated Jul. 23, 2020, 3 pages.
International Search Report and Written Opinion of the ISA for PCT/GB2021/050230 dated May 11, 2021, 10 pages.

* cited by examiner

*Primary Examiner* — Lars A Olson
(74) *Attorney, Agent, or Firm* — Nixon & Vanderhye P.C.

(57) ABSTRACT

A cassette assembly is disclosed attachable to an end portion of a waterborne vessel including a cassette section to bear against an external structure in use. The cassette section is movable relative to the vessel in a direction towards an opposite end of the vessel. A resilient buffer system counters movement of the cassette section when the vessel is moved towards the external structure, wherein the resilient buffer system includes a fluid-operated buffer. A waterborne vessel includes a receiving portion for receiving the cassette assembly, and can be used to service a water-accessible structure such as a wind turbine.

17 Claims, 8 Drawing Sheets

CASSETTE ASSEMBLY, WATERBORNE VESSEL AND METHOD OF SERVICING A WATER-ACCESSIBLE STRUCTURE

CROSS REFERENCE TO RELATED APPLICATIONS

The present application is a National Phase of International Application Number PCT/GB2021/050230 filed Feb. 3, 2021, which designated the U.S. and claims priority benefits from Great Britain Patent Application Number GB 2001920.4, filed Feb. 12, 2020, the entire contents of each of which are hereby incorporated by reference.

FIELD

The present disclosure relates to a cassette assembly for a waterborne vessel, a waterborne vessel to support a cassette assembly, and a method of servicing a water-accessible structure, such as a wind turbine.

BACKGROUND

Various challenges arise in servicing water-accessible structures such as offshore wind turbines with waterborne vessels. One difficulty is that of allowing personnel access to the structure. In one example, the vessel may be deliberately navigated into the water-accessible structure, bringing the vessel into contact with the structure and allowing access thereto. However, a significant impact force can be imparted to the structure and/or the vessel, potentially damaging the structure and/or vessel.

UK Patent Publication No. GB 2490252 A discloses a waterborne vessel with a carriage 15 assembly at one end of the vessel. The carriage assembly is movable relative to the vessel and buffered such that, when the carriage assembly impacts the water-accessible structure, the impact force is absorbed. In order to safely use such a system without damaging either the vessel or the structure, constraints are placed on the operation thereof. This may include limiting the mass of the vessel incorporating the carriage assembly, the impact velocity and the 20 angle of impact of the vessel to the structure.

It is an aim of the invention to address these difficulties, and any other difficulties that would be apparent to the skilled reader from the disclosure herein.

SUMMARY

According to the present invention there is provided an apparatus and method as set forth in the appended claims. Other features of the invention will be apparent from the dependent claims, and the description which follows.

According to a first aspect of the disclosure there is provided a cassette assembly attachable to an end portion of a waterborne vessel, the cassette assembly comprising:

a cassette section to bear against an external structure in use, the cassette section movable relative to the vessel in a direction towards an opposite end of the vessel; and a resilient buffer system to counter movement of the cassette section when the vessel is moved towards the external structure, wherein the resilient buffer system comprises a fluid-operated buffer.

The cassette section may be rotatable, suitably in a horizontal plane.

The cassette section may comprise a walkway formed on an upper surface thereof.

The resilient buffer system may comprise at least two buffers spaced apart across a width of the cassette section.

The cassette section may comprise a fender section configured to contact the external structure. The fender section may be formed of a resilient material. The fender section may comprise a central protrusion, and a pair of recesses positioned at respective transverse sides of the central protrusion. The recesses may comprise a stop surface, to prevent outboard motion of a first support tube of the external structure beyond the stop surface. The recesses and central protrusion may be configured so that contact between the first support tube and the stop surface causes rotation of the cassette section such that the fender section, suitably the central protrusion, contacts a second support tube of the external structure.

The external structure may be an offshore wind turbine. The external structure may be an offshore platform or other fixed or floating structure.

The buffer may be rotatably attached to the cassette section, suitably to permit rotation in a horizontal plane. The buffer may be rotatably attachable to the vessel, suitably to permit rotation in a horizontal plane.

The fluid-operated buffer may be a hydraulic buffer. The fluid-operated buffer may be a pneumatic buffer.

The cassette assembly may comprise a fluid-operated system configured to operate the fluid-operated buffer. The fluid operated system may comprise an accumulator configured to supply fluid to the buffer, suitably to counter compression of the buffer. The accumulator may be a pneumatically-charged accumulator. The fluid-operated system may comprise a flow control unit disposed on a fluid flow path between the buffer and the accumulator. The flow control unit may be configured to provide fluid to the buffer from the accumulator at a predetermined pressure. The flow control unit may comprise a flow restrictor. The flow control unit may comprise a check valve, arranged in parallel with the flow restrictor. The fluid-operated system may comprise a pressure bypass valve disposed on the fluid flow path between the buffer and the accumulator. The pressure bypass valve may be configured to bypass the flow control unit in response to the pressure exceeding a predetermined bypass pressure.

The cassette assembly may comprise a controller configured to adjust an energy absorption and reaction force provided by the buffer. The controller may be configured to adjust a flow rate of the flow control unit and/or a flow rate of the accumulator.

The resilient buffer system may comprise stop elements configured to limit the motion of the cassette section towards the opposite end of the vessel. The stop elements may be formed of a resiliently deformable material. The cassette section may be configured to contact the stop elements before the buffers reach a maximum compression limit.

According to a second aspect of the disclosure there is provided a waterborne vessel comprising a receiving portion, the receiving portion configured to receive a cassette assembly as defined herein.

The receiving portion may be configured to slidably support the cassette assembly. The receiving portion may rotatably support the cassette assembly.

The receiving portion may comprise a recess in the vessel, suitably in a front portion of the vessel. The receiving portion may comprise a rear wall. The rear wall may comprise at least two mounting posts to support the at least two buffers. The receiving portion may comprise substantially vertical side walls.

The receiving portion may extend across at least 50% of the width of a forward portion of the vessel. Suitably, the receiving portion may extend across at least 60% of the width of a forward portion of the vessel. The receiving portion may extend across at least 70% of the width of a forward portion of the vessel.

The waterborne vessel may comprise a cassette assembly disposed in the receiving portion.

Further suitable features of the vessel of the second aspect are defined hereinabove in relation to the cassette assembly of the first aspect, and may be combined in any combination.

According to a third aspect of the disclosure there is provided a method of servicing a water-accessible structure using a waterborne vessel, the waterborne vessel comprising a cassette assembly arranged at an end portion of the waterborne vessel, the method comprising:

bringing a cassette section of the cassette assembly into contact with the water accessible structure, and countering relative movement of the cassette section in a direction towards an opposite end of the vessel using a resilient buffer system, wherein the resilient buffer system comprises a fluid-operated buffer.

The water-accessible structure may be a wind turbine.

Further suitable features of the method of the second aspect are defined hereinabove in relation to the cassette assembly of the first aspect and vessel of the second aspect, and may be combined in any combination.

According to a fourth aspect of the disclosure there is provided use of a cassette assembly and/or waterborne vessel as defined herein.

According to a fifth aspect of the disclosure there is provided a cassette assembly attachable to an end portion of a waterborne vessel, the cassette assembly comprising:

a cassette section to bear against an external structure in use, the cassette section movable relative to the vessel in a direction towards an opposite end of the vessel; and a resilient buffer system to counter movement of the cassette section when the vessel is moved towards the external structure, wherein the cassette section comprises a fender section configured to contact the external structure, the fender section comprising:

a central protrusion; and a pair of recesses positioned at respective transverse sides of the central protrusion.

The recesses may comprise a stop surface, to prevent outboard motion of a first support tube of the external structure beyond the stop surface. The recesses and central protrusion may be configured so that contact between the first support tube and the stop surface causes rotation of the cassette section such that the fender section, suitably the central protrusion, contacts a second support tube of the external structure.

Further suitable features of the assembly of the fifth aspect are defined hereinabove in relation to the cassette assembly of the first aspect and vessel of the second aspect and may be combined in any combination.

BRIEF DESCRIPTION OF DRAWINGS

For a better understanding of the disclosure, and to show how examples of the same may be carried into effect, reference will now be made, by way of example only, to the accompanying diagrammatic drawings in which.

In the drawings, corresponding reference characters indicate corresponding components. The skilled person will appreciate that elements in the figures are illustrated for simplicity and clarity and have not necessarily been drawn to scale. For example, the dimensions of some of the elements in the figures may be exaggerated relative to other elements to help to improve understanding of various example embodiments. Also, common but well-understood elements that are useful or necessary in a commercially feasible embodiment are often not depicted in order to facilitate a less obstructed view of these various example embodiments.

DESCRIPTION OF EMBODIMENTS

In overview, examples of the disclosure provide a cassette assembly attachable to an end portion of a waterborne vessel, comprising a movable cassette section to bear against an external structure and a resilient buffer system to counter movement of the cassette section, wherein the resilient buffer system comprises a fluid-operated buffer, such as a hydraulic or pneumatic buffer. In some examples, the resilient buffer system comprises two buffers spaced apart across a width of the cassette section. The use of a fluid-operated buffer allows the energy absorbed and reaction force exerted by the buffer system to be tuned, for example to suit the vessel or the intended use thereof.

Figure 1:
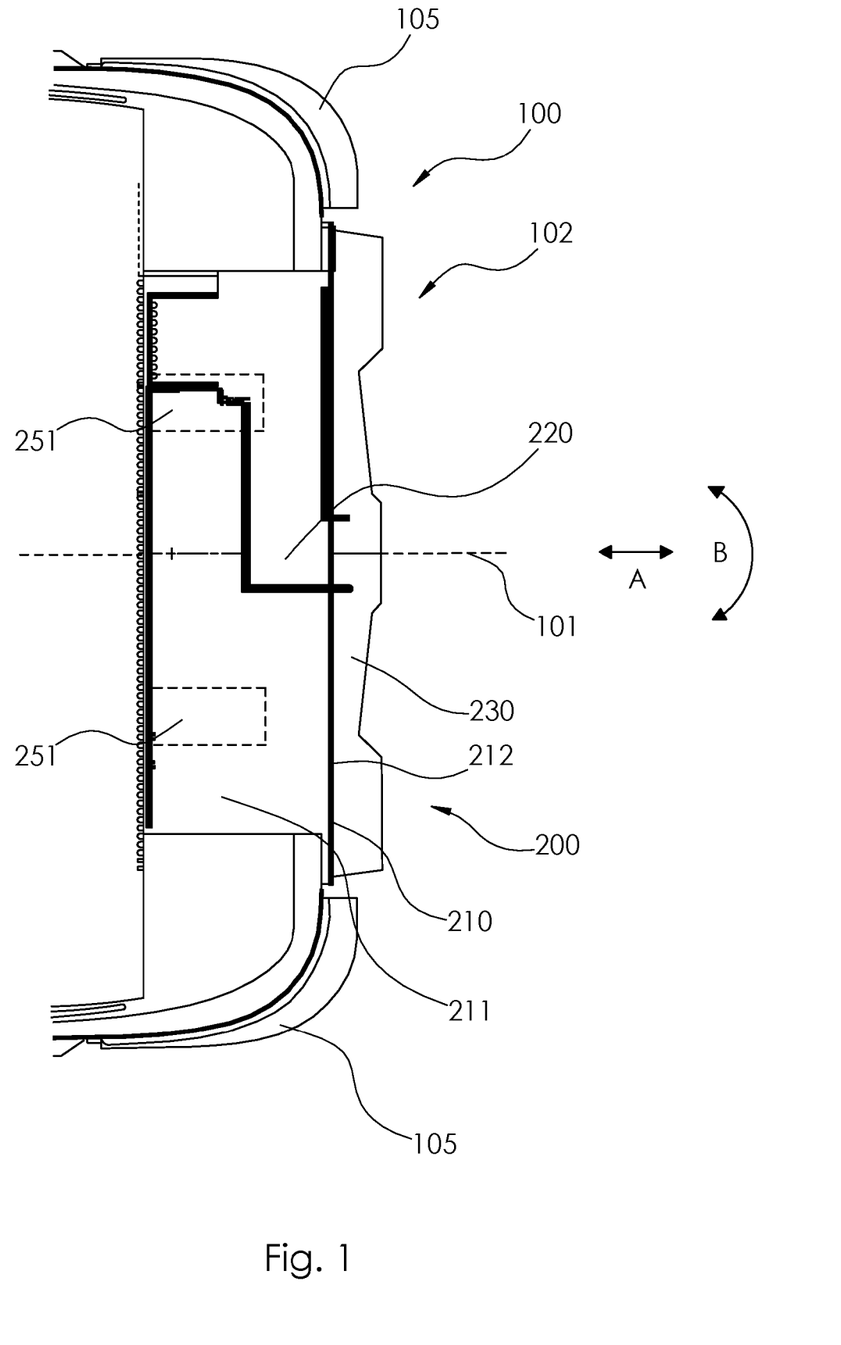
FIG. 1 is an overhead plan view of an end of an example waterborne vessel including an example cassette assembly.
Figure 2:
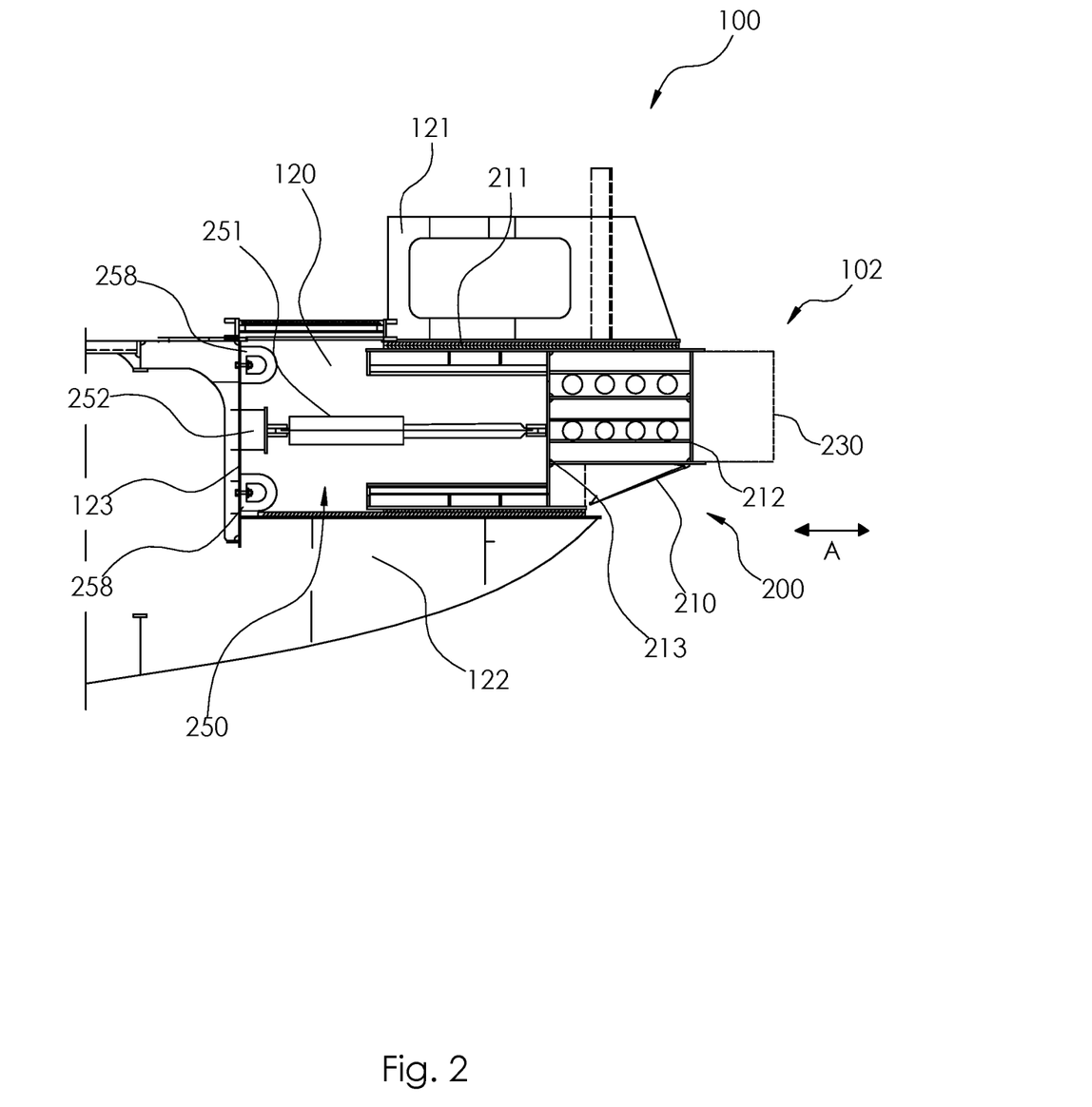
FIG. 2 is a side cross-section view of the end of the example waterborne vessel of FIG. 1.

FIGS. 1 and 2 show the forward portion 102 of an example waterborne vessel 100. The longitudinal centreline of the vessel 100 is indicated by reference numeral 101. The forward portion 102 extends in a horizontal or transverse direction, such that it is generally perpendicular to the centreline 101 when viewed in plan.

The vessel 100, particularly the forward portion 102, comprises a cassette assembly, generally indicated by reference number 200. As can be best seen in FIG. 2, the cassette assembly 200 is disposed in a receiving portion 120 formed in the structure of the vessel 100. For example, the receiving portion 120 takes the form of a recess extending in the transverse direction across the front portion 102, configured to receive the cassette assembly 200.

The receiving portion 120 is bound vertically by substantially horizontal deck plate of the vessel 100. For example, the receiving portion 120 is bound by overhanging bulwark structure 121 above the receiving portion 120 and the hull 122 of the vessel 100 below.

Similarly, the receiving portion 120 is bound horizontally by at its transverse ends by substantially vertical bulkheads. In one example, the vessel 100 is a twin-hull vessel. In such an example, the substantially vertical bulkheads may be arranged on the centreline of each demi-hull of the vessel 100. The rear of the recess 120 may be formed by a substantially vertical transverse bulkhead 123.

The cassette assembly 200 comprises a cassette section 210 or carriage. The cassette section 210 takes the form of a platform, slidably mounted in the receiving portion 120, so that it may move in the longitudinal direction indicated by arrow A. The cassette section 210 may also rotate in a horizontal plane, as indicated by arrow B. For example, the cassette section 210 may comprise arcuate sections at its transverse edges, supported by corresponding arcuate channels.

The upper surface 211 of the cassette section 210 allows users to access the water-accessible structure. For example, a walkway 220 may be formed on the upper surface 211, though it will be understood that in some examples the whole of the upper surface 211 may be walked upon.

A front portion 212 of the cassette section 210 is configured to contact the water-accessible structure. The front portion 212 (and therefore the receiving portion 120) may extend approximately 65-70% of the width of the forward portion 102. As shown in FIG. 1, the front portion 212 may comprise a fender section 230. The fender section 230 is formed of a flexible or resilient material which may compress on contact with the water-accessible structure, such as rubber. The shape of the fender section 230 will be discussed in more detail with reference to FIGS. 4 and 5 hereinbelow. In some examples, the vessel 100 may also comprise fender sections 105 disposed at either side of the cassette assembly.

The cassette assembly 200 also comprises a resilient buffer system 250. The resilient buffer system 250 is configured to counter movement of the cassette section 210 caused by contact between the cassette section 210 and the water-accessible structure. The resilient buffer system 250 comprises a pair of buffers 251. The buffers 251 are spaced apart across the width of the cassette section 210.

The buffers 251 extend from the rear bulkhead 123 of the receiving portion 120 to a stop surface 213 of the cassette section 210. The stop surface 213 may be a substantially vertical surface, forming the end of a guide channel 214 extending horizontally into the cassette section 210. The buffers 251 may be mounted to the rear bulkhead 123 by virtue of a mounting post 252 extending horizontally from the rear bulkhead, to which the buffers 251 may be secured.

Each buffer 251 comprises a fluid-operated ram. For example, the ram 251 may be a hydraulic ram. The ram 251 is rotatably attached to the stop surface 213, so that the ram 251 may rotate in a horizontal plane with respect to the stop surface 213. Similarly, the ram 251 is rotatably attached to the mounting post 252, so that the ram 251 may rotate in a horizontal plane with respect to the mounting post 252. For example, the ram 251 may be coupled to the mounting post 252 and/or stop surface 213 using vertical pins, a ball and socket joint or any other suitable means of providing the desired rotation.

The resilient buffer system 250 furthermore comprises stop elements 258, configured to limit the motion of the cassette section 210 in the longitudinal direction A, towards the opposite end of the vessel from the forward portion 102. The stop elements 258 are disposed in the receiving portion 120, on rear bulkhead 123. For example, two stop elements 258 may be present for each buffer 251, respectively disposed above and below the mounting post 252. Accordingly, the stop elements 258 are configured to contact the cassette section 210 at regions above and below the channel 215. The stop elements 258 are formed of a flexible or resilient material, which may deform upon contact. For example, the stop elements 258 may be rubber fender blocks.

The stop elements 258 ensure that, if the cassette section 210 is moved such that it would contact the rear bulkhead 252, the impact is cushioned so as to prevent damage to the cassette section 210 and/or vessel 100. In one example, the cassette assembly 200 is configured so that the cassette section 210 contacts the stop elements 258 before the buffer 251 reaches its maximum compression limit. Accordingly, damage to the buffer 251 is prevented.

Figure 3:
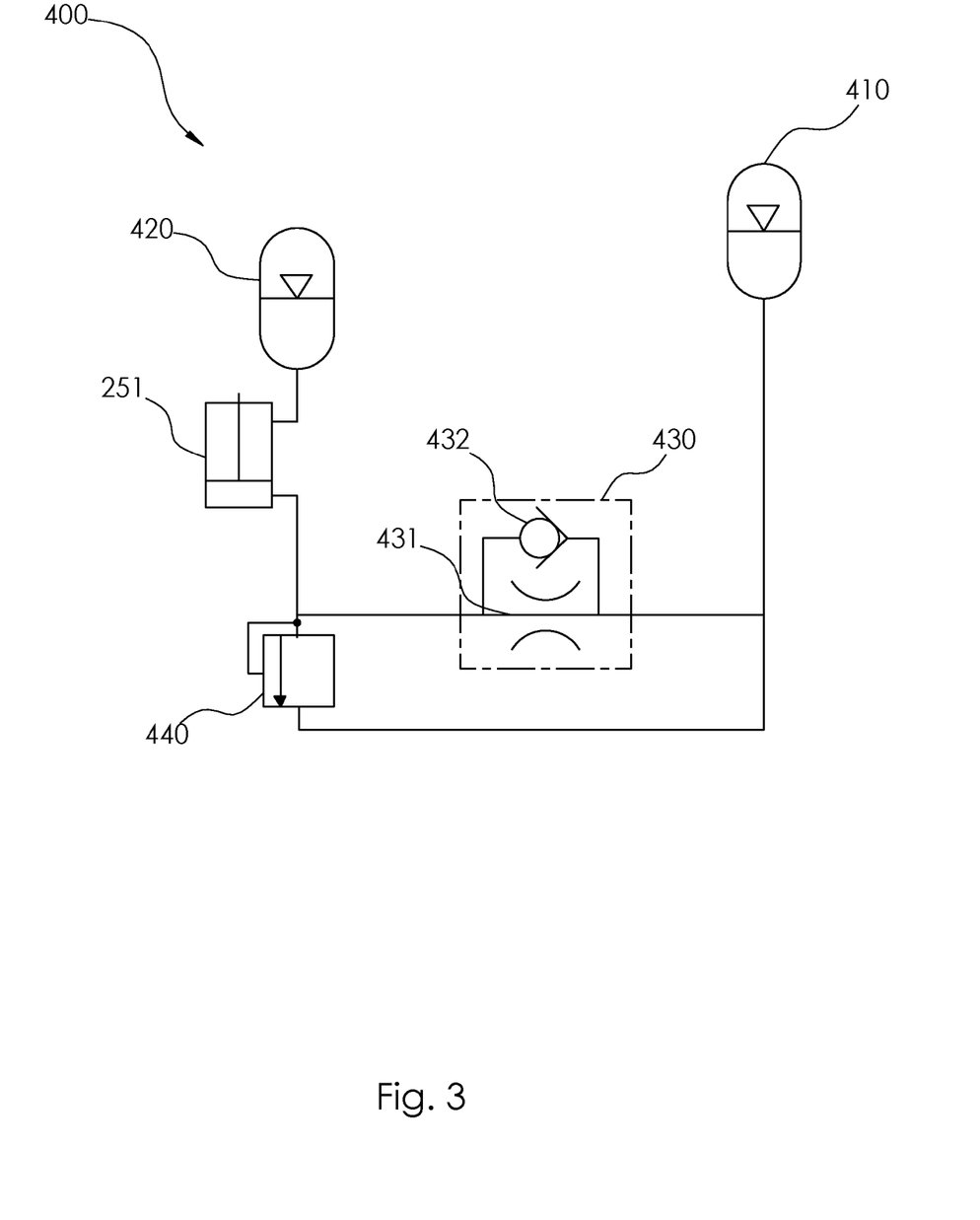
FIG. 3 is a schematic block diagram of an example fluid-operated buffer system.

An example fluid-operated system 400 for operating the ram 251 is illustrated in FIG. 3. In the example of FIG. 3, the fluid-operated system 400 is a hydraulic system. The system 400 includes the ram 251, and a hydraulic accumulator 410 configured to supply fluid to the ram 251 so as to counter the compression of the ram 251. The accumulator 410 may be pneumatically charged, for example with a multi-stage pump. In other examples, the accumulator 410 may be a spring accumulator.

The ram 251 may be a double-acting ram, wherein the rod port of the ram 251 is connected to a fluid reservoir 420 at very low pressure, so as to prevent rusting in use.

In one example, the system 400 also comprises a flow control unit 430. The flow control unit 430 may comprise a flow restrictor 431, such as an orifice plate, and a check valve 432. In one example, the check valve 432 and flow restrictor 431 are arranged in parallel. The flow control unit 430 ensures a predetermined pressure is supplied to the ram 251 and may assist in dissipating heat generated by the system 400.

The system 400 may also comprise a pressure bypass valve 440, fluidly connected between the ram 251 and the accumulator 410. The pressure bypass valve 440 may bypass the flow control unit 440 in the event of excess pressure, for example caused by a strong impact to the ram 251, thereby avoiding overload of the system 400.

The system 400 is configured to provide a resilient bias to the ram 251. Particularly, compression of the ram 251 causes hydraulic fluid in the system 400 to flow to the accumulator 410, where it is stored under pressure. The accumulator 410 will then discharge the pressured fluid via the flow control unit 430 to counter the compression of the ram 251.

In addition, by adjusting the parameters of the accumulator 410 and/or flow control unit 430, the system 400 can be tuned to absorb a desired amount of energy, and to exert a desired reaction force. For example, the flow rate or pressure provided by the accumulator 410 and/or the flow control unit 430 may be adjusted.

In one example, the parameters may be adjusted passively. In other words, the parameters may be tuned upon installation of the system 400 to the vessel 100. This may allow the system 400 to be adjusted according to the characteristics of the vessel 100 (e.g. the mass), as well as the intended usage, without substantial re-engineering of the system 400.

In another example, the parameters may be adjusted actively. For example, the system 400 may comprise a controller (not shown), which may comprise a processor and a memory, configured to adjust the parameters in response to user input. Accordingly, a user may vary the operational characteristics of the fluid-operated system 400 after installation, for example in accordance with the usage or load of the vessel.

In one example, a fluid-operated system 400 is provided for each buffer 251. Accordingly, the example shown in FIG. 1 may comprise two fluid-operated systems 400. In another example, one fluid-operated system 400 may be associated with a plurality of buffers 251.

Whilst the example of FIG. 3 is a hydraulic system in which the fluid is a liquid, such as an oil, in other examples the system may be a pneumatic system in which the fluid may be a gas, such as air.

Figure 4:
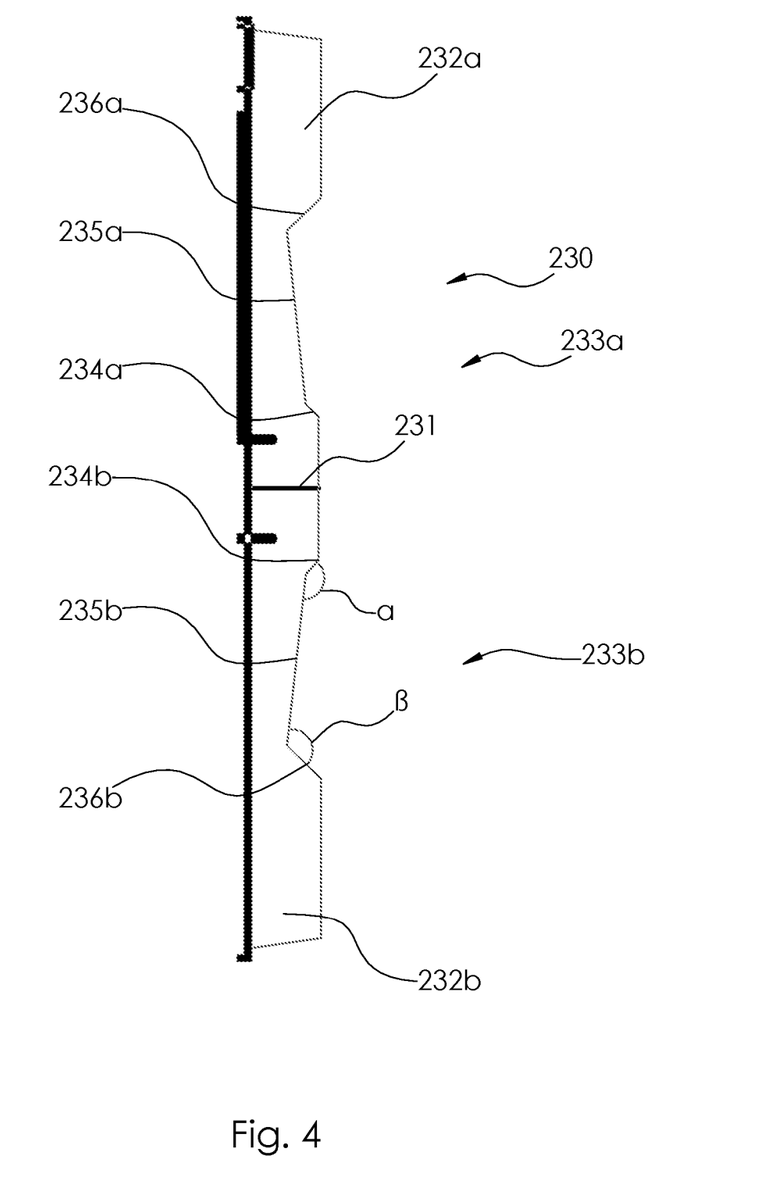
FIG. 4 is a plan view of an example fender section.

Turning now to FIG. 4, the shape of the fender section 230 will be discussed in more detail. The fender section 230 comprises a central protrusion 231, protruding longitudinally from substantially the transverse centre of the fender section 230. The fender section also comprises two transverse protrusions 232a and 232b, respectively arranged port and starboard of the central protrusion 231. Disposed between the central protrusion 231 and the transverse protrusions 232a,b are port and starboard recesses 233a,b.

Each recess 233 has a first sloping portion 234, second sloping portion 235 and third sloping portion 236, arranged consecutively extending away from the central protrusion 231 to its respective transverse protrusion 232. The first sloping portion 234 slopes longitudinally inward (i.e. away from the front portion 102) as it extends transversely away from the central protrusion 231, and the second sloping portion 235 also slopes longitudinally inward as it extends away from the central protrusion 231. The angle of slope of the second sloping portion 235 is shallower than the first sloping portion 234. The recess 233 further comprises a third sloping portion 236, which slopes longitudinally outward (i.e. towards the front portion 102) as it extends towards the transverse protrusion. The angle α between the first and second sloping portions 234, 235 is approximately 130 degrees. The angle β between the second and third sloping portions 235,236 is approximately 130 degrees.

Use of the vessel 100 and cassette assembly 200 will now be described with reference to FIGS. 5A-C, which additionally show a water-accessible structure 300.

For example, the water-accessible structure may be an offshore wind turbine 300. The offshore wind turbine 300 comprises an access structure 310 formed on one side thereof, which allows access to the turbine 300. The access structure 310 comprises a pair of spaced apart support tubes 311, and a ladder 312 disposed between the support tubes 311.

In use, the vessel approaches the turbine 300, and is navigated so that the fender section 230 of the cassette assembly 200 impacts the support tubes 311. Upon the fender section 230 contacting the support tubes 311, a reaction force is imparted to the cassette section 210. The reaction force causes the cassette section 210 to be urged in a rearward direction. The resilient buffer system 250 absorbs the shock of the impact by virtue of the compression of the buffers 251, thereby preventing damage to the vessel 100 and/or the turbine 300.

When the vessel 100 is in contact with the turbine 300, the vessel 100 may be maintained in position by applying a forward thrust (e.g. via a propeller or other motive arrangement of the vessel 100). Personnel wishing to access the turbine 300 may then step onto the walkway 220, and onto the ladder 312. Once any maintenance work has been completed and the personnel have returned to the vessel 100, the vessel 100 applies a reverse thrust, thereby moving away from the wind turbine 300. In doing so, the force which had compressed the buffers 251 is removed, and their resilient nature allows them to re-expand to the condition shown in FIG. 2.

Figure 5A:
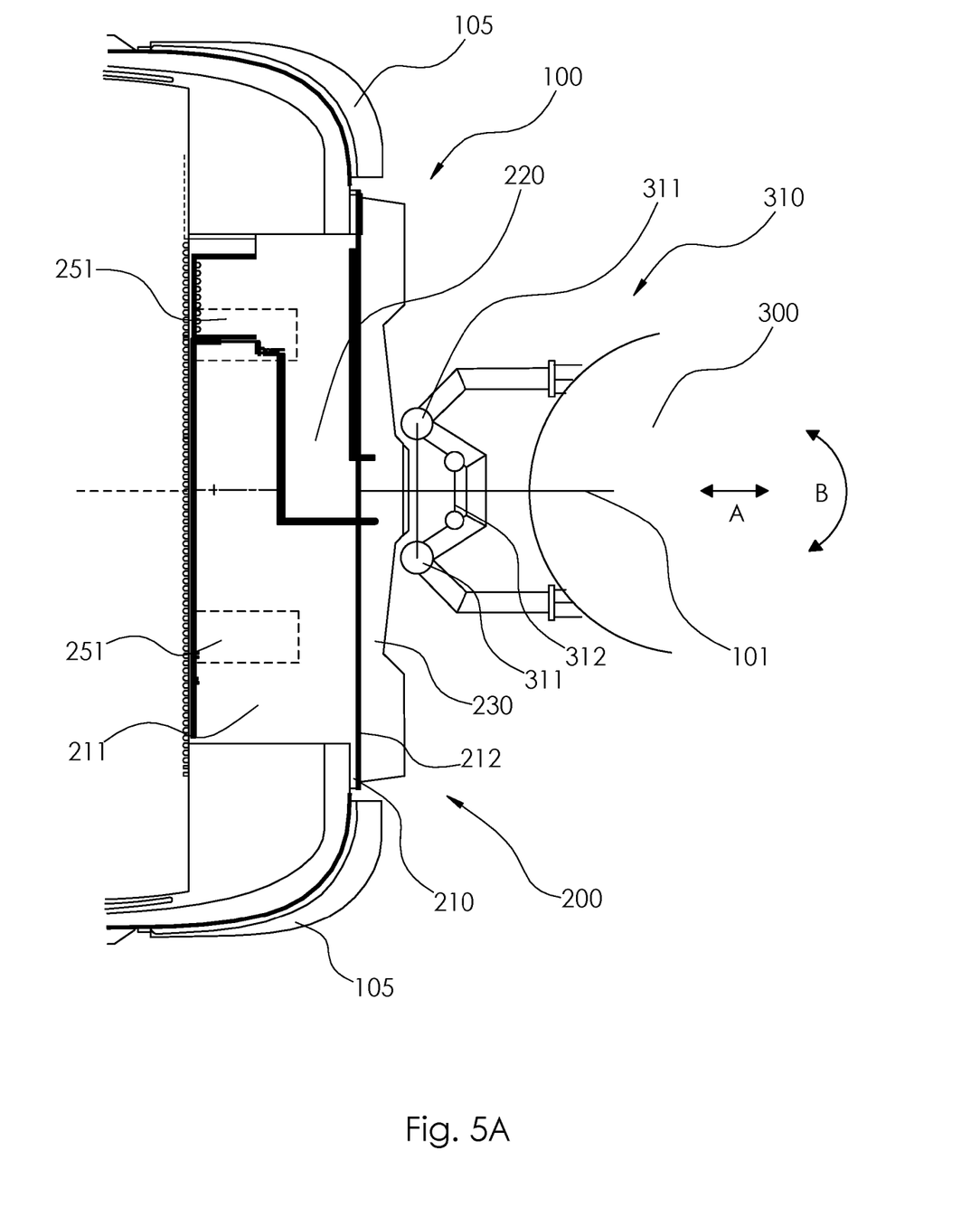
FIGS. 5A-C are overhead plan views of the example waterborne vessel of FIGS. 1 and 2 contacting a water-accessible structure.

In FIG. 5A, the vessel 100 is shown in aligned impact with the turbine 300, such that the longitudinal axis 101 of the vessel 100 is perpendicular to a notional line extending between the tubes 311. In this state, the central protrusion 231 is received in between the tubes 311, with the tubes 311 contacting the recesses 233a,b at either side of the central protrusion 231. This is the ideal situation, with the impact force substantially aligned to the direction of compression of the buffers 251. Furthermore, the location of the central protrusion 231 between the tubes 311 may assist in retaining the vessel 100 in location, for example in the event of wind or current acting on the vessel 100.

Figure 5B:
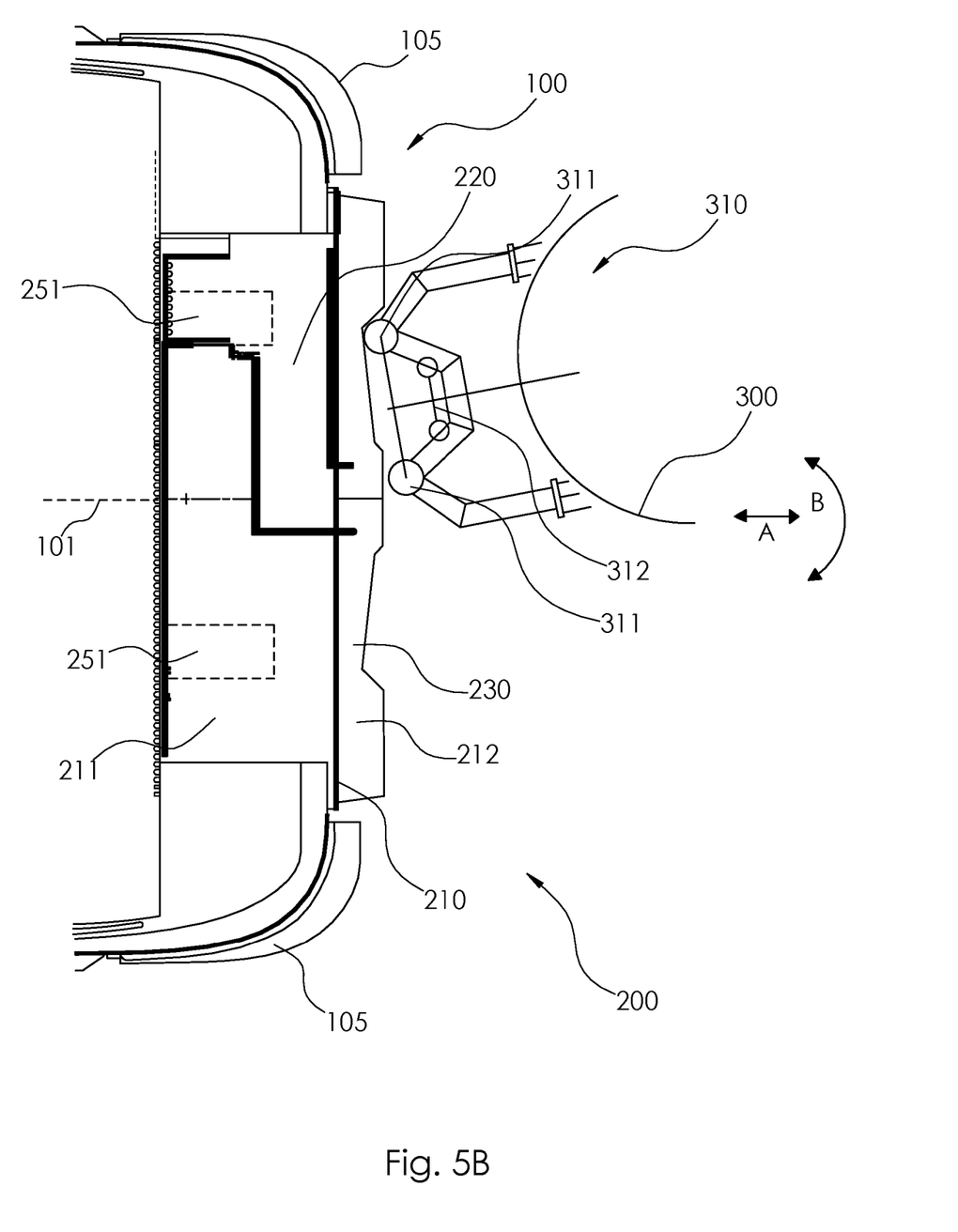

FIG. 5B shows initial contact between the vessel 100 and the turbine 300, with the vessel 100 approximately 10 degrees out of alignment with respect to the position shown in FIG. 5A. In this misaligned approach, a first tube of the support tubes 311 is engaged by the port recess 233a, and captured at the junction of the second sloping portion 235a and third sloping portion 236a. Accordingly, the second and third sloping portion 235,236 act as a stop surface, preventing further outboard motion of the first tube 311 with respect to the fender section 230.

Figure 5C:
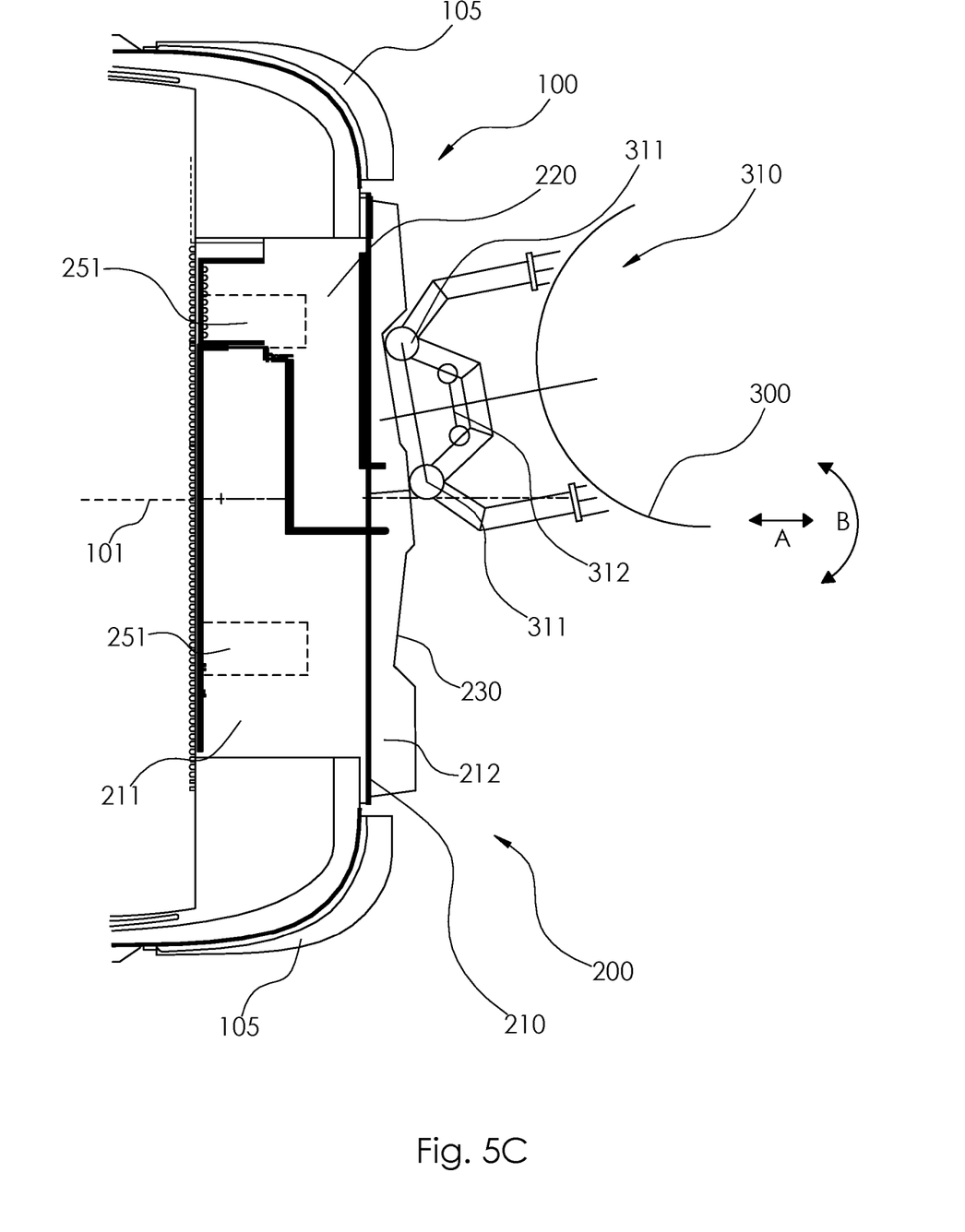

As can be seen in FIG. 5C, the impact causes the port side of the cassette section 210 to move inwardly, causing rotation of the cassette section 210 in the horizontal plane. This brings the central protrusion 231 into contact with the second tube of the support tubes 311. Accordingly, the shape of the fender section 230 ensures that both tubes are contacted, even in the event of a misaligned impact. This ensures the impact is shared between both tubes 311, to prevent damage thereto. It also assists in ensuring that both resilient buffers 251 absorb the impact.

It will be appreciated that, in some examples, the cassette assembly 200 may be retrofitted to a vessel 100 having a suitable receiving portion. For example, the cassette assembly 200 could be bolted or welded to the foredeck of the vessel, for example utilising the open space typically situated on the forward cargo deck of a vessel. Equally, the cassette assembly 200 may be attachable to and detachable from the vessel 100, for example for servicing, repair and the like.

In one example, the cassette assembly may include a fluid-operated buffer 251 and a buffer comprising a compressible element. The compressible element may comprise a fender cell or cone, for example formed from a resiliently compressible material such as rubber. The compressible elements may be capable of being compressed to absorb the energy of the contact between the cassette section 210 and the water-accessible structure. Once the compression force is removed, the compressible elements are configured to experience a restoring force, thereby returning to their initial, substantially uncompressed state. The buffer comprising a compressible element may be a buffer comprising a plurality of compressible elements, which may be arranged in series to form the buffer. The disclosure extends to any combination of any number of fluid-operated buffers and buffers formed from compressible elements, including buffers comprising single or multiple compressible elements.

Figure 6:
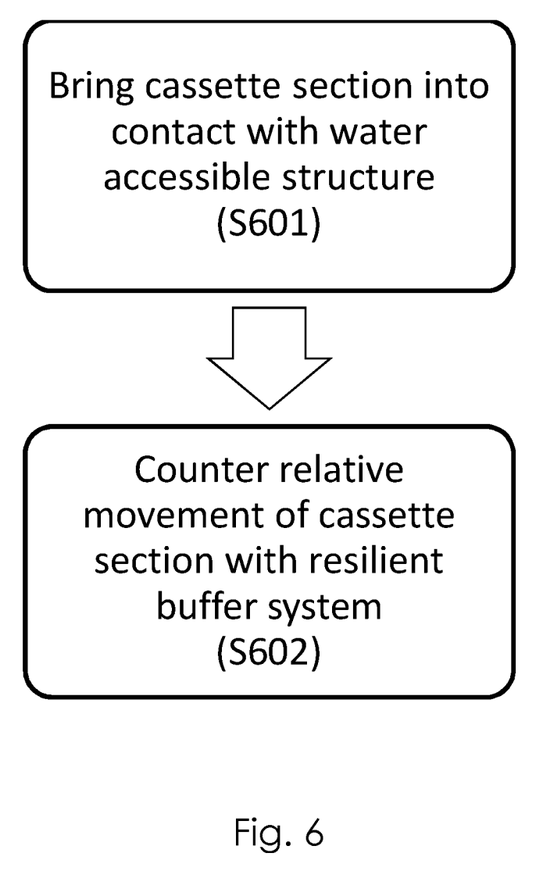
FIG. 6 is a flowchart of an example method of servicing a water-accessible structure.

FIG. 6 illustrates a method of servicing a water-accessible structure using a waterborne vessel comprising a cassette assembly arranged at an end portion of the waterborne vessel. In block S601, a cassette section of the cassette assembly is brought into contact with the water accessible structure. In block S602, relative movement of the cassette section in a direction towards an opposite end of the vessel is countered using a resilient buffer system.

Advantageously, the above-described examples provide an improved vessel for accessing structures in water. The use of fluid-operated buffers results in a system that can be readily tuned to provide a desired energy absorbance and reaction force. Accordingly, substantially the same hardware may be fitted to a wide range of vessels with different masses and different operating restrictions. This may avoid the necessity of procuring different resiliently compressible elements comprised in the buffers for different vessels. In addition, in some examples, the system may be actively tuned, allowing the provision of a desired energy absorbance and reaction force to account for the characteristics of the vessel and/or the external structure being accessed. Furthermore, the use of fluid-operated buffers provides a system able to absorb more energy whilst not exerting a significant increase in impact reaction force. Accordingly, vessels having a greater mass may be used to service water-accessible structures, and a larger tolerance of impact velocities may be permitted. Furthermore, the above-described examples provide a vessel which is able to approach the structure from a wider range of angles without causing damage to either the vessel or the structure, thereby easing operation of the vessel.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A cassette assembly attachable to an end portion of a waterborne vessel, the cassette assembly comprising:
   a cassette section to bear against an external structure in use, the cassette section movable relative to the vessel in a direction towards an opposite end of the vessel,
   a resilient buffer system to counter movement of the cassette section when the vessel is moved towards the external structure,
   wherein the resilient buffer system comprises a fluid-operated buffer,
   wherein the resilient buffer system comprises stop elements configured to limit the motion of the cassette section towards the opposite end of the vessel, and
   wherein the cassette section is configured to contact the stop elements before buffers reach a maximum compression limit.

2. The cassette assembly of claim 1, wherein the cassette section is rotatable in a horizontal plane.

3. The cassette assembly of claim 1, wherein the cassette section comprises a walkway formed on an upper surface thereof.

4. The cassette assembly of claim 1, comprising at least two buffers spaced apart across a width of the cassette section.

5. The cassette assembly of claim 1, wherein the buffer is rotatably attached to the cassette section, to permit rotation in a horizontal plane.

6. The cassette assembly of claim 1, wherein the fluid operated buffer is a hydraulic buffer.

7. The cassette assembly of claim 6, comprising a fluid-operated system configured to operate the fluid-operated buffer, the fluid-operated system comprising an accumulator configured to supply fluid to the buffer to counter compression of the buffer.

8. The cassette assembly of claim 7, wherein the fluid-operated system comprise a flow control unit disposed on a fluid flowpath between the buffer and the accumulator,
   wherein the flow control unit configured to provide fluid to the buffer from the accumulator at a predetermined pressure.

9. A cassette assembly attachable to an end portion of a waterborne vessel, the cassette assembly comprising:
   a cassette section to bear against an external structure in use, the cassette section movable relative to the vessel in a direction towards an opposite end of the vessel,
   a resilient buffer system to counter movement of the cassette section when the vessel is moved towards the external structure,
   wherein the resilient buffer system comprises a fluid-operated buffer,
   wherein the fluid operated buffer is a hydraulic buffer,
   a fluid-operated system configured to operate the fluid-operated buffer, the fluid-operated system comprising an accumulator configured to supply fluid to the buffer to counter compression of the buffer,
   wherein the fluid-operated system comprises a flow control unit disposed on a fluid flowpath between the buffer and the accumulator,
   wherein the flow control unit configured to provide fluid to the buffer from the accumulator at a predetermined pressure,
   wherein the fluid-operated system comprises a pressure bypass valve disposed on the fluid flowpath between the buffer and the accumulator, and
   wherein the pressure bypass valve configured to bypass the flow control unit in response to the pressure exceeding a predetermined bypass pressure.

10. The cassette assembly of claim 1, wherein the fluid-operated buffer is a pneumatic buffer.

11. The cassette assembly of claim 1, comprising a controller configured to adjust an energy absorption and/or reaction force provided by the fluid-operated buffer.

12. A cassette assembly attachable to an end portion of a waterborne vessel, the cassette assembly comprising:
    a cassette section to bear against an external structure in use, the cassette section movable relative to the vessel in a direction towards an opposite end of the vessel,
    a resilient buffer system to counter movement of the cassette section when the vessel is moved towards the external structure,
    wherein the resilient buffer system comprises a fluid-operated buffer,
    wherein the cassette section comprises a fender section configured to contact the external structure, the fender section comprising:
    a central protrusion, and
    a pair of recesses positioned at respective transverse sides of the central protrusion, wherein the recesses comprise a stop surface, to prevent outboard motion of a first support tube of the external structure beyond the stop surface, wherein the recesses and central protrusion are configured so that contact between the first support tube and the stop surface causes rotation of the cassette section such that the central protrusion contacts a second support tube of the external structure.

13. A waterborne vessel comprising a receiving portion, the receiving portion configured to receive the cassette assembly of claim 1.

14. The waterborne vessel of claim 13, wherein the receiving portion comprises a recess in the vessel.

15. The waterborne vessel of claim 13, comprising a cassette assembly disposed in the receiving portion.

16. A method of servicing a water-accessible structure using a waterborne vessel, the waterborne vessel comprising a cassette assembly arranged at an end portion of the waterborne vessel, the method comprising:
- bringing a cassette section of the cassette assembly into contact with the water accessible structure,
- countering relative movement of the cassette section in a direction towards an opposite end of the vessel using a resilient buffer system,
- wherein the resilient buffer system comprises a fluid-operated buffer and stop
- wherein the resilient buffer system comprises stop elements configured to limit the motion of the cassette section towards the opposite end of the vessel, and wherein the cassette section is configured to contact the stop elements before buffers reach a maximum compression limit.

17. The method of claim 16, wherein the water-accessible structure is a wind turbine.

\* \* \* \* \*